Dec. 26, 1967  M. B. HARDING  3,360,095
CONVEYOR CHAIN
Filed April 12, 1965
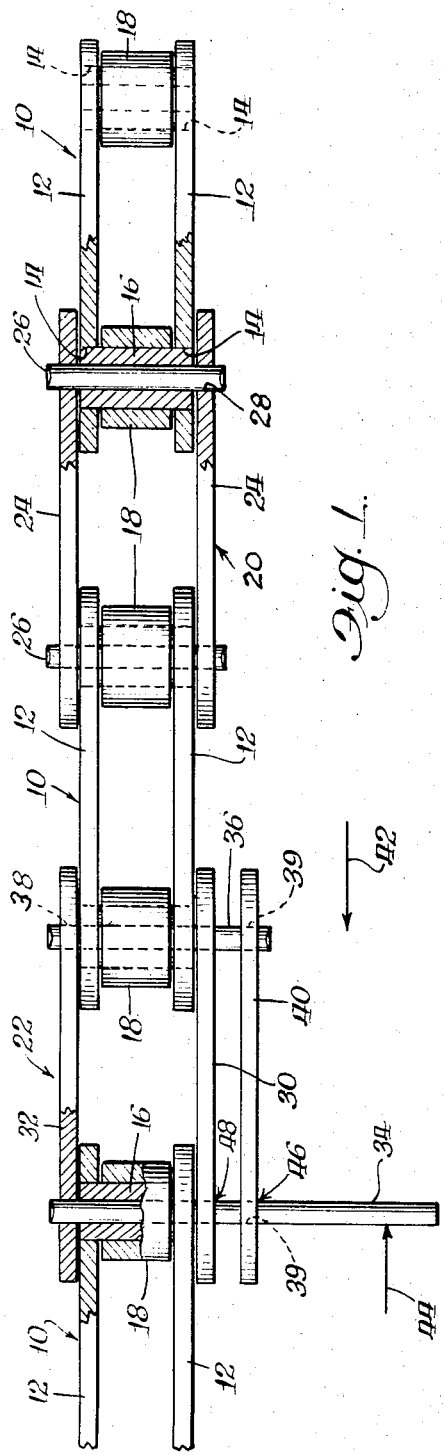
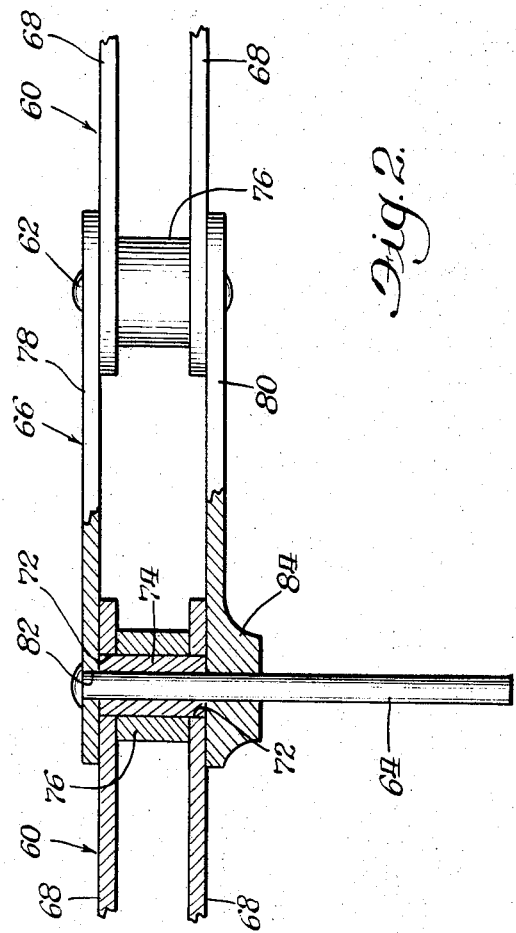
Inventor:
Max Bower Harding

United States Patent Office 3,360,095
Patented Dec. 26, 1967

3,360,095
CONVEYOR CHAIN
Max Bower Harding, Kirklin, Ind., assignor to Amsted Industries Incorporated, Chicago, Ill., a corporation of New Jersey
Filed Apr. 12, 1965, Ser. No. 447,505
3 Claims. (Cl. 198—1)

This invention relates to conveyor chains and, more particularly, to roller chains of the type comprising a plurality of links interconnected by cross pins, with one or more of the cross pins extending laterally beyond a side of the chain.

For many purposes, roller chains are provided with one or more extended pins which are utilized to do work such as pushing, pulling or carrying. Single chains such as this are used for timing or conveying, and frequently two parallel chains having converging and aligned extended pins are employed to form a conveyor with tubing or special cross flights mounted on the extended pins.

If, during the movement of such a chain, the extended pin should meet an obstruction, the pin might either bend or break, depending upon the hardness of the extended pin, which is almost directly proportional to its strength. The bend or break of the extended pin would occur at the junction of the extended portion of the pin and the outside edge of the link plate hole through which the pin extends, since that is where the greatest bending moment will occur. If the extended pin is of sufficient hardness to obtain the desired shear strength and wear properties, it is likely to break where it extends out of the pin link plate, without any bending. The break might extend inside the pitch hole of the pin link plate to cause a separation of the chain. On the other hand, if the extended pin is of a reduced hardness so that it will bend, but not break, the strength of the chain will be impaired and the pin will have poor wear properties. The bending of the extended pin at the junction thereof with the link plate will tend to close the pin (or outer) link plate in on the articulating roller (or inner) link plate to result in a tight, or even binding, joint of the interconnected links.

This invention is based on an improved roller chain having one or more extended pins, which chain is designed such that the bending or breaking of an extended pin will not result in the binding of links or in the separation of the chain. In accordance with this invention, the pin link which is interconnected by the extended pin to an adjacent roller link is provided with a brace means, e.g., in the form of an auxiliary plate spaced from the pin link or a boss on the outboard side of the pin link, through which the extended pin extends in a snug fit therewith, so that any bending or breaking of the extended portion of the pin will occur away from the interconnected links. In addition, the extended pin may be given a dual heat treatment, if desired, so that the portion of the pin that is used to interconnect the links will satisfactorily withstand articulation wear and resist shear, and the extended portion will bend without breaking.

It is, therefore, a primary object of this invention to provide a roller chain with one or more extended pins which will bend or break under excessive loads at a point spaced from the link plates of the links interconnected by the extended pin.

Another object of this invention is to provide a roller chain having one or more extended pins which is designed such that the integrity of the chain will be maintained upon the breaking of the extended pin.

Still another object of this invention is to provide a roller chain having one or more extended pins, which pins have different degrees of hardness in different portions thereof.

A further object of this invention is to provide a roller chain having one or more articulating joints formed with an extended pin passing through an external brace means spaced from where the respective link plates are interconnected.

These and further objects of this invention will become apparent or be described as the description thereof herein proceeds and reference is made to the accompanying drawings in which:

FIGURE 1 is a fragmentary plan view, partly in section, of a roller chain embodying this invention; and FIGURE 2 is a fragmentary plan view, partly in section, of a roller chain embodying an alternative embodiment of this invention.

This invention is best described by reference to the accompanying drawings, particularly FIGURE 1, wherein the chain illustrated is a roller chain consisting of alternating roller (or inner) links and pin (or outer) links, pivotally interconnected. Roller links 10 are of conventional design, being comprised of a pair of spaced parallel link plates 12 having adjacent each end thereof holes 14 in which bushings 16 are received with a press fit. Bushings 16 rotatably support rollers 18 for engagement with the teeth of the sprockets with which the chain to be used. Roller links 10 interconnect the pin links of the chain, which include pin links 20 of conventional design and one or more pin links 22 of the present invention. Pin links 20 include a pair of spaced, parallel link plates 24 overlapping at the ends thereof the ends of the adjacent roller links 10. Connection between the overlapping ends of roller links 10 and pin links 22 is accomplished by pins 26, which rotatably support bushings 16 and are press-fitted in holes 28 adjacent the ends of link plates 24.

Pin links 22, embodying this invention, include a pair of spaced, parallel link plates 30 and 32 overlapping at the ends thereof the adjacent roller links 10. Pins 34 and 36, which are press-fitted in aligned holes 38 adjacent the ends of link plates 30 and 32, rotatably support bushings 16 of the adjacent roller links 10 and laterally extend beyond the same side of pin link 22. Pins 34 and 36 are press-fitted in holes 39 provided in auxiliary plate 40 so as to maintain auxiliary plate 40 in spaced, and preferably parallel, relationship with respect to adjacent link plate 30. Pin 36 terminates at auxiliary plate 40, while pin 34 laterally extends beyond auxiliary plate 40 so that it may be used for the desired purpose.

If pin 34 should meet an obstruction when the chain is in use and is traveling in the direction indicated by arrow 42, so that a load is applied to the portion of pin 34 extending beyond auxiliary plate 40, as indicated by arrow 44, a bending moment will be applied to the pin. The greatest bending moment will be applied to pin 34 at fulcrum point 46, which is where pin 34 extends out of auxiliary plate 40. It will therefore be evident that auxiliary plate 40 serves to maintain the integrity of the chain if the hardness of pin 34 is such that it will break upon meeting an obstruction. The break will occur where pin 34 extends out of auxiliary plate 40, but the break will not extend to the joint of the links interconnected by pin 34 to result in separation of the chain. On the other hand, if the hardness of pin 34 is such that load 44 will cause it to bend, the bending of pin 34 might move the end of auxiliary plate 40 through which pin 34 extends toward link plate 30, but not sufficiently to effect the spacing between link plates 30 and 32.

In contradistinction, if auxiliary plate 40 were not provided, as in the case of the prior art, the greatest bending moment would be at fulcrum point 48, i.e., where pin 34 extends out of link plate 30. As hereinbefore discussed, the breaking of pin 34 in proximity to link plate 30 could result in a separation of the chain, while the bending of pin 34 at this location could cause a tightening or binding of the joint of the links interconnected by pin 34.

If desired, pin 34 may be given a dual heat treatment so that the portion thereof interconnecting link 22 and the respective adjacent link 10 is harder than the portion of pin 34 extending beyond auxiliary plate 40. By having such different degrees of hardness in the two portions of pin 34, the harder portion interconnecting link 22 with the respective adjacent roller link 10 is of sufficient hardness to withstand articulation wear and resist shear to obtain the desired chain properties, while the extended portion of pin 34 is not as hard and will bend upon hitting an obstruction. The portion of pin 34 between those having the two extremes of hardness, i.e., between the inner side of auxiliary plate 40 and the outer side of link plate 30, will have a transitional hardness.

Reference is now made to FIGURE 2 which illustrates an alternative embodiment of this invention. The chain includes roller links 60 which are interconnected by pins 62 and 64 to pin link 66, embodying this invention. Roller links 60 are of conventional design, being comprised of spaced, parallel link plates 68, which are provided adjacent the ends therefore with aligned holes 72. Holes 72 receive bushings 74 that rotatably support rollers 76.

The pin link 66 includes spaced, parallel link plates 78 and 80 having aligned holes 82 at the two ends thereof. Link plates 78 and 80 overlap the ends of link plates 68 of the adjacent roller links 60 so that holes 82 are aligned with the openings through bushings 74. The interconnection between pin link 66 and the adjacent roller links 60 is achieved by pins 62 and 64, extending through bushings 74 and being press-fitted in holes 82. Link plate 80 is provided with boss 84 on the outboard side thereof through which pin 64 extends. Boss 84 snugly engages pin 64 so as to serve the same purpose as auxiliary plate 40 of the embodiment illustrated in FIGURE 1.

If during the use of the chain pin 64 should break due to its hitting an obstruction, the integrity of the chain will still be maintained since boss 84 is of sufficient thickness that any break occurring in pin 64 will not extend inwardly in boss 84 to such a degree to result in the separation of the chain.

Although this invention has been described in relation to specific embodiments, it will be apparent that obvious modifications may be made by one skilled in the art without departing from the intended scope of the invention as defined by the appended claims. For example, various modifications may be made in the use of an auxiliary plate through which the extended pin passes. More specifically, pin 36 (FIGURE 1) may be terminated where it is press-fitted in hole 28 in link plate 30, with the necessary support being afforded auxiliary plate 40 by a web interconnecting link plate 30 and auxiliary plate 40. In such a modification, it will be apparent that auxiliary plate 40 be not extended from pin 34 the full length of link plate 30, but only to the supporting web.

Another modification of the embodiment utilizing an auxiliary plate would be to have the auxiliary plate alongside a roller link and secured to the adjacent roller link plate, as by a web. However, the extended pin could not be press-fitted within the opening of the auxiliary plate, since the extended pin would rotate with respect to the auxiliary plate when the chain is used. The extended pin should have a snug rotatable fit within the opening in the auxiliary plate to provide the desired support for the pin.

I claim:

1. A link chain comprising a first link including laterally spaced apart link plate means interconnected at their opposite longitudinal ends by cross pins to second and third links respectively, each of said second and third links including laterally spaced link plates having ends overlapping and disposed between the respective ends of the link plate means of said first link, one of said spaced link plate means of said first link including a separate laterally outwardly positioned auxiliary plate, each of said cross pins having a press fit in the plate means of said first link, and the cross pin which is press fitted in said auxiliary plate extending through and outwardly substantially beyond said auxiliary plate.

2. A link chain as claimed in claim 1 in which said named cross pin extends outwardly substantially farther than the other cross pin of said first link.

3. A link chain as claimed in claim 1 in which the portion of said named cross pin which extends outwardly beyond said auxiliary plate has a hardness less than the portion of said pin interconnecting the two link plate means.

References Cited

UNITED STATES PATENTS

| 2,377,253 | 5/1945 | Lemmon | 198—175 |
| 2,443,010 | 6/1948 | Petsheys | 198—175 |
| 3,246,734 | 4/1966 | Carvallo | 198—189 |

OTHER REFERENCES

Jastrzebski: Nature and Properties of Engineering Materials, 1959, page 205, Wiley and Sons, Inc., New York.

RICHARD E. AEGERTER, *Primary Examiner.*

EVON C. BLUNK, A. C. HODGSON,
*Assistant Examiners.*